US007833343B2

(12) United States Patent
Plueg et al.

(10) Patent No.: US 7,833,343 B2
(45) Date of Patent: Nov. 16, 2010

(54) UNIVERSAL STIR-IN PIGMENTS

(75) Inventors: Carsten Plueg, Muehltal/Niederbeerbach (DE); Jesús Pitarch López, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/513,442

(22) PCT Filed: Sep. 28, 2007

(86) PCT No.: PCT/EP2007/008445

§ 371 (c)(1), (2), (4) Date: May 7, 2009

(87) PCT Pub. No.: WO2008/055566

PCT Pub. Date: May 15, 2008

(65) Prior Publication Data

US 2010/0068642 A1 Mar. 18, 2010

(30) Foreign Application Priority Data

Nov. 6, 2006 (DE) .................. 10 2006 052 139

(51) Int. Cl.
C09B 67/04 (2006.01)
C09B 67/20 (2006.01)

(52) U.S. Cl. ............... 106/493; 106/31.09; 106/31.11; 106/31.75; 106/31.93; 106/281.1; 106/413; 106/476; 106/494; 106/495; 106/496; 106/497; 106/498; 106/499; 51/298; 71/27; 252/582; 430/108.1; 430/108.2

(58) Field of Classification Search .............. 106/413, 106/493, 494, 495, 496, 497, 498, 499, 31.09, 106/31.11, 31.75, 31.93, 281.1, 476; 51/298; 71/27; 252/582; 430/108.2, 108.1
See application file for complete search history.

(56) References Cited

U.S. PATENT DOCUMENTS

| | | | | |
|---|---|---|---|---|
| 4,761,465 A | * | 8/1988 | Speranza et al. | 528/45 |
| 5,324,812 A | * | 6/1994 | Speranza et al. | 528/338 |
| 5,648,408 A | * | 7/1997 | Babler | 523/333 |
| 5,820,666 A | * | 10/1998 | Babler | 106/412 |
| 5,883,220 A | | 3/1999 | Armand et al. | |
| 6,063,182 A | * | 5/2000 | Babler | 106/506 |
| 6,440,207 B1 | * | 8/2002 | Schulz | 106/412 |
| 6,547,870 B1 | * | 4/2003 | Griessmann et al. | 106/417 |
| 7,318,864 B2 | * | 1/2008 | Reisacher et al. | 106/499 |
| 2006/0178450 A1 | * | 8/2006 | Ruffieux et al. | 523/205 |
| 2010/0075161 A1 | * | 3/2010 | Lindgren et al. | 428/452 |

FOREIGN PATENT DOCUMENTS

| | | |
|---|---|---|
| DE | 10204583 | 8/2003 |
| DE | 10 2006 021 178 A1 * | 11/2007 |
| EP | 0529791 | 3/1995 |
| EP | 1132434 | 9/2001 |
| WO | WO 94/12986 | 6/1994 |
| WO | WO 2004/074383 | 9/2004 |

OTHER PUBLICATIONS

PCT International Search Report for PCT/2007/008445, mailed Dec. 29, 2008.
English Translation of the PCT International Preliminary Report on Patentability for PCT/EP2007/008445, mailed Jun. 18, 2009.

* cited by examiner

Primary Examiner—Anthony J Green
(74) Attorney, Agent, or Firm—Anthony A. Bisulca

(57) ABSTRACT

The invention relates to a pigment preparation containing (a) 50-99 percent by weight of at least one pigment, (b) 1 to 50 percent by weight of an additive based on polyalkylene glycols, and (c) 0 to 10 percent by weight of an auxiliary agent from among the group comprising fillers, fire retardants, preservatives, light-stability agents, pigmentary and non-pigmentary dispersing agents, surfactants, antioxidants, foam inhibitors, resins, and antistatic agents, the percentages being in relation to the total weight of the pigment preparation. The additive that is based on polyalkylene glycols corresponds to formula $Z'\text{-}[\text{-}(AO\text{---})_{n_1}\text{---}B\text{-}T\text{-}X\text{---}Y]_m\text{---}Z$ (1), wherein AO represents a $C_2\text{-}C_{10}$ alkyleneoxy unit, B represents a $C_2\text{-}C_{10}$ alkylene radical, and T represents —NR—, X represents one of the groups (formula), and Y represents a chemical bond or —$NR^3$—.

17 Claims, No Drawings

UNIVERSAL STIR-IN PIGMENTS

The present invention provides easily dispersible pigment preparations comprising at least one pigment and an additive based on polyalkylene glycols. The invention also provides the process for preparing them and their use for coloration of natural and synthetic materials, in particular paints, coating systems, emulsion colors and varnish colors of any kind.

Dispersing pigments in an application system is a critical and far from straightforward operation. Easily dispersible pigment preparations, or stir-in pigments, can be incorporated into the application system with significantly lower energy input and higher and faster color development compared with conventional pigments, which is of substantial economic advantage.

WO 2004/074 383 (US 2006/0178450) discloses stir-in pigments which are easily dispersed in solvent-containing application media only.

DE 102 04 583 describes stir-in pigments based on polyethers and anionic surface-active additives. The composition of the polyethers is chosen according to the application system into which the pigment preparation has to be incorporated, so there is no guarantee that the pigments are easily dispersible in media of differing polarity.

EP-A1-1 132 434 discloses the preparation of readily dispersible organic pigments through the use of dispersants based on aromatic polyalkylene glycols. These stir-in pigments are compatible with aqueous application systems only.

There is a need for pigment preparations which have easy or ready dispersibility in aqueous and solvent-containing application media alike. Such stir-in pigments shall be universally compatible and their incorporation shall take place equally easily and without additional steps irrespective of the application medium. Easily or readily dispersible is to be understood as meaning that the pigment is incorporable into the application system with very low energy input and high and rapid color development. Gentle shearing forces, for example the action of a dissolver (saw-tooth stirrer), shall suffice to achieve complete dispersion of the pigments, removing the need for any further cost-intensive dispersing steps in the application system.

We have found that, surprisingly, hereinbelow defined pigment preparations based on organic or inorganic pigments and specific polyalkylene glycols are easily or readily dispersible in aqueous and solvent-containing application media alike.

The present invention accordingly provides a pigment preparation comprising
(a) 50% to 99% by weight, preferably 70% to 97.5% by weight, of at least one pigment,
(b) 1% to 50% by weight preferably 2.5% to 30% by weight, of an additive based on polyalkylene glycols, and
(c) 0% to 10% by weight, preferably 0.01% to 5% by weight, of an auxiliary from the group of the fillers, flame retardants, preservatives, light stabilizers, pigmentary and nonpigmentary dispersants, surfactants, antioxidants, defoamers, resins and antistats,
all based on the overall weight of the pigment preparation, wherein the additive based on polyalkylene glycols conforms to formula (1) where $$Z'-[-(AO-)_n-B-T-X-Y]_m-Z \qquad (1)$$

wherein
AO represents a $C_2$-$C_{10}$-alkyleneoxy unit, wherein A may be the same or different and n is greater than 1,
B represents a $C_2$-$C_{10}$-alkylene radical,
T represents —$NR^1$—, where
$R^1$ is a direct covalent bond to X, or is a hydrogen atom, a $C_1$-$C_{18}$-alkyl radical, a $C_3$-$C_7$-cycloalkyl radical, benzyl or a substituted or unsubstituted $C_6$-$C_{18}$-aryl radical, where the substituents have the meaning of halogen, in particular fluorine, chlorine or bromine, methyl, ethyl, propyl, butyl, methoxy, ethoxy, propoxy, butoxy, nitro or $CF_3$,
X represents one of the groups

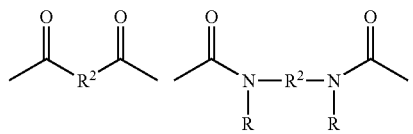

where
R is a hydrogen atom, a $C_1$-$C_{18}$-alkyl radical, a $C_3$-$C_7$-cycloalkyl radical, benzyl, or a substituted or unsubstituted $C_6$-$C_{18}$-aryl radical, where the substituents have the meaning of halogen, in particular fluorine, chlorine or bromine, methyl, ethyl, propyl, butyl, methoxy, ethoxy, propoxy, butoxy, nitro or $CF_3$;
$R^2$ is a $C_1$-$C_{18}$-alkylene radical, a $C_3$-$C_7$-cycloalkylene radical, a substituted or unsubstituted $C_6$-$C_{18}$-arylene radical or a sensible chemical combination thereof and the substituents have the meaning of halogen, in particular fluorine, chlorine or bromine, methyl, ethyl, propyl, butyl, methoxy, ethoxy, propoxy, butoxy, nitro or $CF_3$;
or X is one of the following groups:

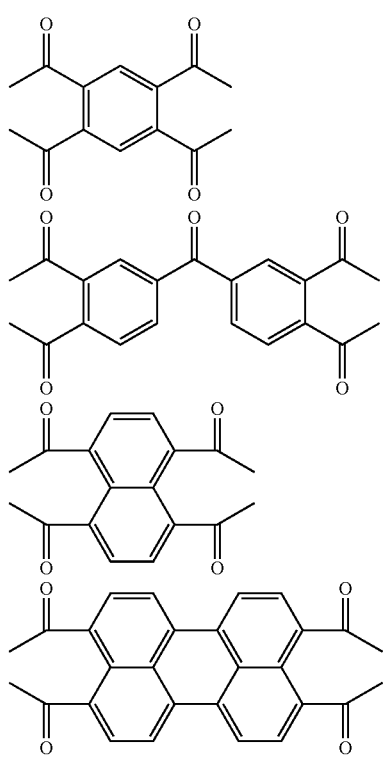

Y represents a chemical bond or —$NR^3$—, where $R^3$ has one of the meanings recited for $R^1$;
Z' is an amino group or is a radical which underlies the group X—Y and is derived from a carboxylic acid or from a carboxylic acid derivative, for example from an anhydride, acyl chloride or ester, or is a radical which underlies the group X—Y and is derived from an isocyanate, Z is a radical which underlies the group $(AO)_n$—B and is derived from an amine or is a radical which underlies the group X and is derived from a carboxylic acid or from a carboxylic acid derivative, for example from an anhydride, acyl chloride or ester, or is a radical which underlies the group X and is derived from an isocyanate, n is a number between 1 and 200, for example from 2 to 150; and m is a number between 1 and 100, for example from 2 to 50, in particular from 2 to 10.

Component (a) of the pigment preparation according to the present invention is a finely divided organic or inorganic pigment or a mixture of various organic and/or inorganic pigments. Component (a) can also be a dye which is insoluble in certain solvents and has pigment character therein. The pigments can be used not only in the form of a dry powder but also as a water-moist presscake.

Useful organic pigments include monoazo, disazo, laked azo, β-naphthol, Naphthol AS, benzimidazolone, disazo condensations and azo metal complex pigments and polycyclic pigments such as, for example, phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments, or an acidic to alkaline carbon black from the group of the furnace blacks and gas blacks.

Of the organic pigments mentioned, particularly suitable ones are in a very fine state of subdivision for preparing the preparations in that preferably 95% and more preferably 99% of the pigment particles have a particle size ≦500 nm.

An exemplary selection of particularly preferred organic pigments includes carbon black pigments, for example gas or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81.

Useful inorganic pigments include for example titanium dioxides, zinc sulfides, zinc oxides, iron oxides, manganese iron oxides, chromium oxides, ultramarine, nickel or chromium antimony titanium oxides, cobalt oxides, mixed oxides of cobalt and of aluminum, rutile mixed phase pigments, sulfides of the rare earths, bismuth vanadates and also cut pigments.

The organic pigment is preferably combined with carbon black and/or titanium dioxide.

It is further possible to use laked dyes such as calcium, magnesium, aluminum lakes of dyes comprising sulfonic acid and/or carboxylic acid groups.

Preferred polyalkylene glycols are those of the formula (1) where

AO represents an ethyleneoxy (EO) unit, a propyleneoxy (PO) unit or a combination thereof. The EO and PO units may form an alternating arrangement, a blockwise arrangement or a random arrangement.

Preferred polyalkylene glycols are further those of the formula (1) where

B represents an ethylene or propylene radical.

Preferred polyalkylene glycols are further those of the formula (1) where $R^1$ or $R^3$ is a direct covalent bond to X, a hydrogen atom, a $C_1$-$C_4$-alkyl radical, a $C_5$-$C_6$-cycloalkyl radical or phenyl.

Preferred polyalkylene glycols are further those of the formula (1) where

R is a hydrogen atom, a $C_1$-$C_4$-alkyl radical, a $C_5$-$C_6$-cycloalkyl radical or phenyl.

Preferred polyalkylene glycols are further those of the formula (1) where $R^2$ is a $C_1$-$C_{12}$-alkylene radical, a $C_5$-$C_6$-cycloalkylene radical, a substituted or unsubstituted $C_6$-$C_{10}$-arylene radical, where the substituents have the recited meanings.

Preferred polyalkylene glycols are further those of the formula (1) wherein X represents one of the groups

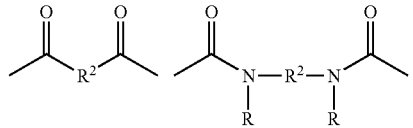

-continued

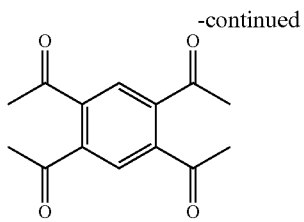

where
R is a hydrogen atom and
$R^2$ is a $C_1$-$C_{12}$-alkylene radical or an unsubstituted $C_6$-$C_{10}$-arylene radical.

Particularly preferred polyalkylene glycols are those of the formula (1) wherein AO represents a block structure $[(PO)_c(EO)_a(PO)_d]$, where
c is a number from 1 to 10, in particular from 1 to 6,
d is a number from 1 to 10, in particular from 1 to 6,
a is a number from 1 to 95, in particular from 2 to 90, and
c+d+a=n, where n is a number from 5 to 100, in particular from 10 to 85;

B represents an ethylene or propylene radical;
T represents —$NR^1$—, where
$R^1$ is a hydrogen atom or a direct covalent bond to X;
X represents one of the groups

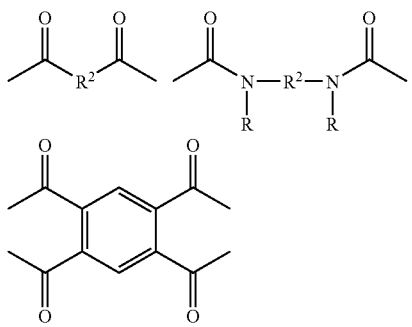

where
R is a hydrogen atom,
$R^2$ is a $C_1$-$C_{12}$-alkylene radical or an unsubstituted $C_6$-$C_{10}$-arylene radical;
Y represents a chemical bond or —$NR^3$—, where
$R^3$ is a hydrogen atom or a direct covalent bond to X;
Z and Z' have the abovementioned meaning, and
m is a number between 2 and 30.

Z and Z' are end groups of the polyalkylene glycols of the formula (1) and can be amino groups, isocyanate groups or radicals of a carboxylic acid which may each be derivatized through known reactions. These reactions can be for example alkylations, amidations, halogenations, hydrolysis, esterifications, condensations, saponifications, imidations or sulfonations.

The polyalkylene glycols of the formula (1) can also be mixtures with various end groups Z and Z', as formed for example from the following reaction:

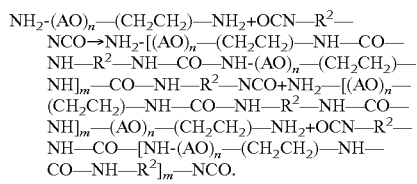

The polyalkylene glycols used according to the present invention are obtainable similarly to the methods described in U.S. Pat. No. 5,324,812, U.S. Pat. No. 4,761,465 or in WO 94/12986 (EP-0 672 291 B1). However, so far they have not been used as dispersing auxiliaries for pigments, and no pigment preparations comprising such polyalkylene glycols have been described.

The auxiliaries described as component (c) are known to a person skilled in the art and can be added in the recited amounts to the pigment preparations according to the present invention without impairing the stir-in properties of the pigment preparation. The auxiliaries differ structurally from the polyalkylene glycols of the formula (1).

The pigment preparation according to the present invention is pulverulent or a granulate and preferably has a particle size $d_{50}$ in the range from 0.03 to 0.60 µm. Granulates are obtainable by spray drying for example.

The present invention also provides a process for preparing the pigment preparations according to the present invention, which comprises mixing said component (a) in the form of powder, granulate or press cake in the presence of water or of an organic solvent or of a mixture of water and organic solvent with said component (b) and optionally said component (c).

Particularly advantageous mixing can be achieved through the use of a grinding or dispersing assembly. As such, stirred systems, dissolvers (saw-tooth stirrers), rotor-stator mills, ball mills, stirred media mills, such as sand and bead mills, high-speed mixers, kneading apparatus, roll stands or high-performance bead mills can be used. The fine dispersing/grinding of the pigments is carried on to the desired particle size distribution and can take place at temperatures in the range from 0 to 100° C., advantageously at a temperature between 10 and 70° C., preferably at 20 to 60° C.

Depending on the type of pigment, the pigment suspension obtained can be subjected to a finishing operation. The finishing operation is advantageously carried out in the existing organic solvent, water or water-solvent mixture at a temperature of 50 to 250° C., particularly 70 to 200° C., especially 100 to 190° C., and advantageously for a period in the range from 5 minutes to 24 hours, particularly 5 minutes to 18 hours, especially 5 minutes to 6 hours. The finishing operation is preferably carried out at the boiling temperature, especially at temperatures above the boiling point of the solvent system under superatmospheric pressure. Organic solvents which can be separated from the aqueous phase by steam distillation are conveniently removed in this manner before isolation of the pigment preparation, particularly when recovery of the solvent used is desired.

The pigment preparations obtained by following the process according to the present invention can be isolated using customary methods, for example by filtration, decanting, centrifugation, spray drying, fluidized bed drying, belt drying, spray granulation or drying in a paddle dryer. The pigment preparations according to the present invention are preferably isolated by filtration and final drying. When the pigment preparation obtained has a coarse particle size, it is advantageously additionally subjected to a dry grinding operation.

The pigment preparations according to the present invention are useful for pigmenting and coloring natural and synthetic materials of any kind, in particular paints, coating systems, such as wallpaper colors, printing compositions, emulsion and varnish colors, that are water and/or solvent containing.

The pigment preparations according to the present invention are further useful for coloration of macromolecular materials of any kind, for example natural and synthetic fiber materials, preferably cellulose fibers, but also for paper pulp dyeing and also laminate coloration. Further applications are the manufacture of printing compositions, for example textile print pastes, flexographic printing inks, decorative printing colors or gravure printing inks, wallpaper colors, water-thinnable varnishes, wood preservation systems, viscose dope dyeings, varnishes, sausage casings, seed, fertilizers, glass, in particular glass bottles, and also for mass coloration of roof shingles, as colorants in electrophotographic toners and developers, for coloration of renders, concrete, woodstains, colored pencil leads, felt tip pens, waxes, paraffins, graphics inks, ballpoint pen pastes, chalks, washing and cleaning compositions, shoe care agents, latex products, abrasives and also for coloring plastics, or high molecular weight materials of any kind. High molecular weight organic materials include for example cellulose ethers and esters, such as ethylcellulose, nitrocellulose, cellulose acetate or cellulose butyrate, natural resins or synthetic resins, such as addition polymerization resins or condensation resins, for example aminoplasts, in particular urea- and melamine-formaldehyde resins, alkyd resins, acrylic resins, phenoplasts, polycarbonates, polyolefins, such as polystyrene, polyvinyl chloride, polyethylene, polypropylene, polyacrylonitrile, polyacrylic esters, polyamides, polyurethanes or polyesters, rubber, caseine, latices, silicone, silicone resins, individually or mixed.

The pigment preparations of the present invention are further useful in the manufacture of liquid printing inks for use in all conventional ink jet printers, in particular for those which are based on the bubble jet or piezo process. These liquid printing inks can be used to print paper but also natural or synthetic fiber materials, foil, film, sheet and plastics. The pigment preparations of the present invention can further be used for printing all manner of coated or uncoated substrate materials, for example for printing paperboard, cardboard, wood and woodbase materials, metallic materials, semiconductor materials, ceramic materials, glasses, glass and ceramic fibers, inorganic materials, concrete, leather, food products, cosmetics, skin and hair. The substrate material in question may be two-dimensionally planar or spatially extended, i.e., three-dimensionally structured, and be printed or coated both completely or only partially.

The pigment preparations according to the present invention are further useful as colorants for powders and powder coatings, in particular for triboelectrically or electrokinetically sprayable powder coatings used for surface coating of articles composed for example of metal, wood, plastic, glass, ceramic, concrete, textile material, paper or rubber.

The pigment preparations of the present invention are also useful as colorants in liquid inks, preferably ink jet inks, for example on an aqueous or nonaqueous basis ("solvent based"), microemulsion inks, UV-curable inks and also in such inks as function according to the hot-melt process.

The pigment preparations according to the present invention are also useful as colorants for color filters for flat panel displays not only for additive but also subtractive color generation, also for photoresists and also as colorants for "electronic inks" ("e-inks") or "electronic paper" ("e-paper").

The present invention also provides a process for coloring a high molecular weight organic material, which comprises uniformly dispersing an effectively pigmenting amount of a stir-in pigment preparation of the present invention in the organic material by stirring the pigment preparation into a suspension or solution of the organic material. Stirring is to be understood as meaning any kind of mixing using minimal shearing forces, including shaking for example. An effectively pigmenting amount is usually between 0.01 and 30% by weight of pigment preparation, based on the weight of the organic material to be pigmented.

EXAMPLES

Synthesis of Polyalkylene Glycols 16.22 g of polyalkylene glycol diamine (600 g/mol) were dissolved in 80 ml of chloroform at room temperature under nitrogen. Then, 3.78 g of 1,6-diisocyanatohexane in 20 ml of chloroform were added dropwise and the mixture was stirred for 30 min at room temperature and then for 20 min under reflux. The solvent was subsequently removed and the remaining high-viscosity liquid was dried in vacuo leaving 20 g of polyalkylene glycol of formula 1.1.
$^{13}$C NMR δ(CDCl$_3$)=158.5 ppm.

225.16 g of polyalkylene glycol diamine (4000 g/mol) were melted at 50° C. under nitrogen. Then, 10 g of benzene-1,2,4,5-tetracarboxylic anhydride were added and the mixture was stirred at 140° C. for 2 hours and then cooled down to room temperature to give 233.56 g of polyalkylene glycol of formula 1.2.
$^{13}$C NMR δ(CDCl$_3$)=166.3 ppm.

0.72 g of terephthaloyl dichloride and 20 g of polyalkylene glycol diamine (4000 g/mol) were stirred in a 100 ml flask under nitrogen at 50° C. for 30 min and at 120° C. for 4 hours. The mixture was cooled down to room temperature to give 18.52 g of polyalkylene glycol of formula 1.3. $^{13}$C NMR δ(CDCl$_3$)=151.0 ppm.

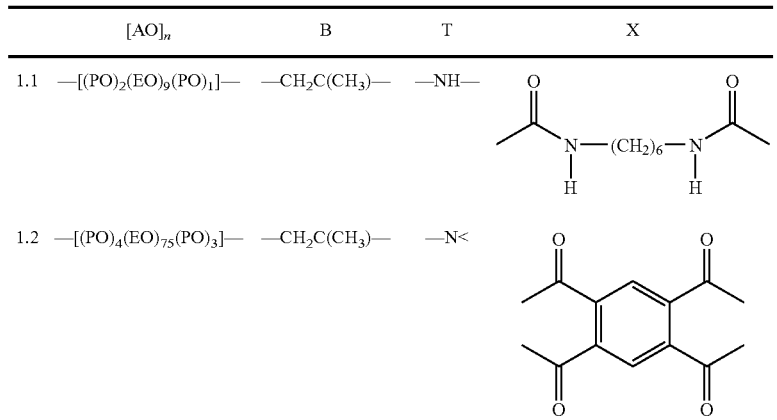

|     | [AO]$_n$ | B | T | X |
| --- | --- | --- | --- | --- |
| 1.1 | —[(PO)$_2$(EO)$_9$(PO)$_1$]— | —CH$_2$C(CH$_3$)— | —NH— | (structure: -C(=O)-NH-(CH$_2$)$_6$-NH-C(=O)-) |
| 1.2 | —[(PO)$_4$(EO)$_{75}$(PO)$_3$]— | —CH$_2$C(CH$_3$)— | —N< | (structure: benzene-1,2,4,5-tetracarbonyl) |

-continued

| | | | | |
|---|---|---|---|---|
| 1.3 | —[(PO)₄(EO)₇₅(PO)₃]— | —CH₂C(CH₃)— | —NH— | 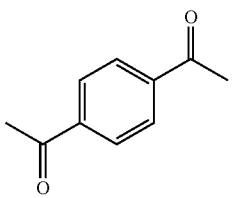 |

| | Y | m | Z' | Z |
|---|---|---|---|---|
| 1.1 | —NH— | 6 | —NH₂ | —[(PO)₂(EO)₉(PO)₁]—CH₂C(CH₃)—NH₂ |
| 1.2 | >N— | 5 | —NH₂ | —[(PO)₄(EO)₇₅(PO)₃]—CH₂C(CH₃)—NH₂ |
| 1.3 | —NH— | 2 | —NH₂ | —[(PO)₄(EO)₇₅(PO)₃]—CH₂C(CH₃)—NH₂ |

The analytical data suggest that the amine is the end group in all cases.

Preparation of Inventive Pigment Preparations:

Example 1

A suspension of 36 g of Pigment Red 122 (C.I. No. 73915, used as 31.7% by weight press cake) in 100 g of water and 400 g of isobutanol are, after admixture of 7.9 g of polyalkylene glycol of formula 1.1, dispersed in a static mixer (Laborpilot 2000, IKA, D-79219 Staufen) at 6000 rpm for 30 minutes. The mixture is subjected to a pressurized finishing operation at 125° C. for 3 hours. Then, the isobutanol is distilled off and the coated pigment is filtered off, washed with water and dried at 80° C. in a drying cabinet. Dry grinding (M20 universal mill, IKA, 2 times 15 sec) leaves 30 g of easily/readily dispersible pulverulent Pigment Red 122.

Example 2

A suspension of 36 g of Pigment Red 122 (C.I. No. 73915, used as 31.7% by weight press cake) in 100 g of water and 400 g of isobutanol are, after admixture of 7.9 g of polyalkylene glycol of formula 1.2, dispersed in a static mixer (Laborpilot 2000, IKA, D-79219 Staufen) at 6000 rpm for 30 minutes. The mixture is subjected to a pressurized finishing operation at 125° C. for 3 hours. Then, the isobutanol is distilled off and the coated pigment is filtered off, washed with water and dried at 80° C. in a drying cabinet. Dry grinding (M20 universal mill, IKA, 2 times 15 sec) leaves 35 g of easily/readily dispersible pulverulent Pigment Red 122.

Example 3

A suspension of 83.0 g of Pigment Orange 36 (C.I. No. 11780, used as 30% by weight press cake) in 800 g of water and 470 g of isobutanol is admixed with 9.3 g of polyalkylene glycol of the formula 1.2. The mixture is subjected to a pressurized finishing operation at 110° C. for 2 hours. Then, the isobutanol is distilled off and the coated pigment is filtered off, washed with water and dried at 100° C. in a drying cabinet. Dry grinding (M20 universal mill, IKA, 2 times 15 sec) leaves 90 g of easily/readily dispersible pulverulent Pigment Orange 36.

Example 4

A suspension of 83.0 g of Pigment Orange 36 (C.I. No. 11780, used as 30% by weight press cake) in 800 g of water and 470 g of isobutanol is admixed with 9.3 g of polyalkylene glycol of the formula 1.3. The mixture is subjected to a pressurized finishing operation at 110° C. for 2 hours. Then, the isobutanol is distilled off and the coated pigment is filtered off, washed with water and dried at 100° C. in a drying cabinet. Dry grinding (M20 universal mill, IKA, 2 times 15 sec) leaves 90 g of easily/readily dispersible pulverulent Pigment Orange 36.

Example 5

A suspension of 139 g of Pigment Violet 23 (C.I. No. 51319), used as swing mill millbase having a pigment content of 73.6% by weight and a BET surface area of 2.4 m²/g, in 250 g of water and 300 g of isobutanol is, after addition of 56.6 g of polyalkylene glycol of formula 1.2, dispersed in a static mixer (Laborpilot 2000, IKA, D-79219 Staufen) at 6000 rpm for 15 minutes. The mixture is subjected to a pressurized finishing operation at 130° C. for 3 hours. Then, the isobutanol is distilled off and the coated pigment is filtered off, washed with water and dried at 80° C. in a drying cabinet. Dry grinding (M20 universal mill, IKA, D-79219 Staufen) leaves 125 g of easily/readily dispersible pulverulent Pigment Violet 23.

Example 6

A suspension of 60.0 g of Pigment Yellow 139 (C.I. No. 56298, used as 32% by weight press cake) in 480 g of water is admixed with 6.6 g of polyalkylene glycol of the formula 1.2. The mixture is subjected to a pressurized finishing operation at 140° C. for 2 hours. Then, the coated pigment is filtered off, washed with water and dried at 80° C. in a drying cabinet. Dry grinding (M20 universal mill, IKA, 2 times 15 sec) leaves 50 g of easily/readily dispersible pulverulent Pigment Yellow 139.

Example 7

A suspension of 60.0 g of Pigment Yellow 139 (C.I. No. 56298, used as 32% by weight press cake) in 480 g of water is admixed with 6.6 g of polyalkylene glycol of the formula 1.1. The mixture is subjected to a pressurized finishing operation at 140° C. for 4 hours. Then, the coated pigment is filtered off, washed with water and dried at 80° C. in a drying cabinet. Dry grinding (M20 universal mill, IKA, 2 times 15 sec) leaves 50 g of easily/readily dispersible pulverulent Pigment Yellow 139.

To evaluate their disperisibility, the pigment preparations are tested in a solvent-containing alkyd-melamine (AM) baking finish and in a waterborne polyester-melamine (WPM) baking finish.

Pigmenting an AM Varnish:

A dissolver equipped with a 4 cm toothed disk was used to disperse 21.6 g of the easily/readily dispersible pigment preparation (Examples 3, 4, 6 and 7) in 38.4 g of an alkyd-melamine grind varnish for 30 min at 50° C. and 10 000 rpm. 10 g of this pigmented grind varnish were admixed with 26 g of a letdown mix by slow stirring with a glass rod at room temperature.

To prepare the white reduction, 6 g of the above masstone varnish were homogenized with 20 g of alkyd-melamine white varnish (30% $TiO_2$) by simple manual stirring.

A dissolver equipped with a 4 cm toothed disk was used to disperse 9.6 g of the easily/readily dispersible pigment preparation from Examples 1, 2 and 5 in 50.4 g of an alkyd-melamine grind varnish for 30 min at 50° C. and 10 000 rpm. 8 g of this pigmented grind varnish were admixed with 24 g of a letdown mix by slow stirring with a glass rod at room temperature.

To prepare the white reduction, 7.5 g of the above masstone varnish were homogenized with 20 g of alkyd-melamine white varnish (30% $TiO_2$) by simple manual stirring.

Pigmenting a waterborne polyester-melamine (WPM) varnish:

A dissolver equipped with a 4 cm toothed disk was used to disperse 23.8 g of the easily/readily dispersible pigment preparation (Examples 3, 4, 6 and 7) in 42.2 g of a waterborne polyester-melamine grind varnish for 30 min at 50° C. and 10 000 rpm. 20.0 g of this pigmented grind varnish were admixed with 52.0 g of a letdown mix by slow stirring with a glass rod at room temperature.

To prepare the white reduction, 4.0 g of the above masstone varnish were homogenized with 20.0 g of WPM white varnish (20% by weight $TiO_2$) by simple manual stirring.

A dissolver equipped with a 4 cm toothed disk was used to disperse 10.6 g of the easily/readily dispersible pigment preparation from Examples 1, 2 and 5 in 55.4 g of a waterborne polyester-melamine grind varnish for 30 min at 50° C. and 10 000 rpm. 20.0 g of this pigmented grind varnish were admixed with 60.0 g of a letdown mix by slow stirring with a glass rod at room temperature.

To prepare the white reduction, 5.0 g of the above masstone varnish were homogenized with 20.0 g of WPM white varnish (20% by weight $TiO_2$) by simple manual stirring.

As reference examples, the pigments ®Hostaperm Rosa E (P.R. 122), Hostaperm Violett RL spezial (P.V. 23) and ®Novoperm Orange HL 70 (P.O.36) and ®Novoperm Yellow M2R70 (P.Y. 139) from Clariant were dispersed into the abovementioned varnish system using the dissolver and compared with the pigment preparations from Examples 1 to 7. The color strength found shows that the inventive pigment preparations develop a very much higher color strength in both varnish systems, not only in the solvent-containing alkyd-melamine varnish but also in the waterborne polyester-melamine varnish.

|  | AM | WPM |
| --- | --- | --- |
| Hostaperm Rosa E | 100% | 100% |
| Example 1 | 242% | 115% |
| Example 2 | 212% | 105% |
| Novoperm Orange HL 70 | 100% | 100% |
| Example 3 | 117% | 118% |
| Example 4 | 126% | 125% |
| Hostaperm Violett RL spez. | 100% | 100% |
| Example 5 | 169% | 195% |
| Novoperm Yellow M2R70 | 100% | 100% |

-continued

|  | AM | WPM |
| --- | --- | --- |
| Example 6 | 167% | 115% |
| Example 7 | 185% | 128% |

What is claimed is:

1. A pigment preparation comprising
(a) 50% to 99% by weight of at least one pigment,
(b) 1% to 50% by weight of an additive based on polyalkylene glycols, and
(c) 0% to 10% by weight of an auxiliary selected from the group consisting of fillers, flame retardants, preservatives, light stabilizers, pigmentary and nonpigmentary dispersants, surfactants, antioxidants, defoamers, resins and antistats, all based on the overall weight of the pigment preparation, wherein the additive based on polyalkylene glycols is of formula (I) where $$Z'-[-(AO-)_n-B-T-X-Y]_m-Z \quad (1)$$

wherein

AO is a $C_2$-$C_{10}$-alkyleneoxy unit, wherein A may be the same or different and n is greater than 1, B is a $C_2$-$C_{10}$-alkylene radical, T is $-NR^1-$, where $R^1$ is a covalent bond to X, a hydrogen atom, a $C_1$-$C_{18}$-alkyl radical, a $C_3$-$C_7$-cycloalkyl radical, benzyl or a substituted or unsubstituted $C_6$-$C_{18}$-aryl radical, where the substituents are halogen, methyl, ethyl, propyl, butyl, methoxy, ethoxy, propoxy, butoxy, nitro or $CF_3$, X is one of the groups

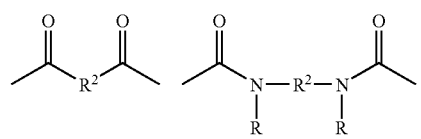

where

R is a hydrogen atom, a $C_1$-$C_{18}$-alkyl radical, a $C_3$-$C_7$-cycloalkyl radical, benzyl, or a substituted or unsubstituted $C_6$-$C_{18}$-aryl radical, where the substituents are halogen, methyl, ethyl, propyl, butyl, methoxy, ethoxy, propoxy, butoxy, nitro or $CF_3$;

$R^2$ is a $C_1$-$C_{18}$-alkylene radical, a $C_3$-$C_7$-cycloalkylene radical, a substituted or unsubstituted $C_6$-$C_{18}$-arylene radical or a chemical combination thereof and the substituents are halogen, methyl, ethyl, propyl, butyl, methoxy, ethoxy, propoxy, butoxy, nitro or $CF_3$;

or X is one of the following groups:

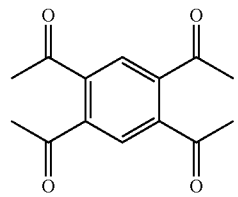

-continued

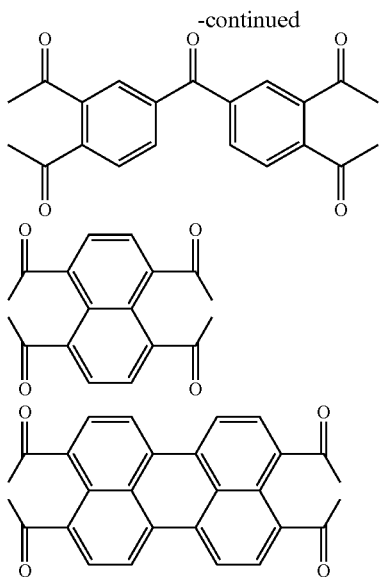

wherein
Y is a chemical bond or —NR³—, where R³ is a covalent bond to X, a hydrogen atom, a $C_1$-$C_{18}$-alkyl radical, a $C_3$-$C_7$-cycloalkyl radical, benzyl or a substituted or unsubstituted $C_6$-$C_{18}$-aryl radical, where the substituents are halogen, methyl, ethyl, propyl, butyl, methoxy, ethoxy, propoxy, butoxy, nitro or $CF_3$;
Z' is an amino group,
Z is a radical of the formula $(AO)_n$—B-amino,
n is a number between 1 and 200; and
m is a number between 1 and 100.

2. The pigment preparation as claimed in claim 1 wherein the at least one pigment is an organic pigment selected from the group consisting of monoazo, disazo, laked azo, β-naphthol, Naphthol AS, benzimidazolone, disazo condensations, azo metal complex pigments polycyclic pigments, diketopyrrolopyrrole pigments and an acidic to alkaline carbon black.

3. The pigment preparation as claimed in claim 1, wherein AO is an ethyleneoxy unit, a propyleneoxy unit or a combination thereof.

4. The pigment preparation as claimed in claim 1, wherein B is an ethylene or propylene radical.

5. The pigment preparation as claimed in claim 1, wherein X is one of the groups

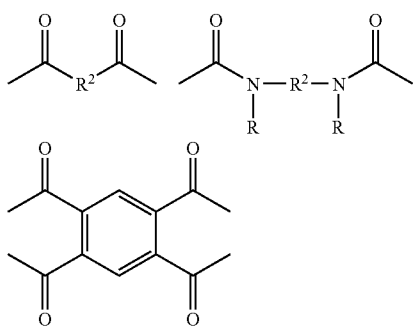

where
R is a hydrogen atom and
R² is a $C_1$-$C_{12}$-alkylene radical or an unsubstituted $C_6$-$C_{10}$-arylene radical.

6. The pigment preparation as claimed in claim 1, wherein n is a number between 2 to 150.

7. The pigment preparation as claimed in claim 1, wherein m is a number between 2 to 50.

8. The pigment preparation as claimed in claim 1, wherein
AO is a block structure $[(PO)_c(EO)_a(PO)_d]$, where
c is a number from 1 to 10,
d is a number from 1 to 10,
a is a number from 1 to 95, and
c+d+a=n, where n is a number from 5 to 100;
B is an ethylene or propylene radical;
T is —NR¹—, where
R¹ is a hydrogen atom or a direct covalent bond to X;
X is one of the groups

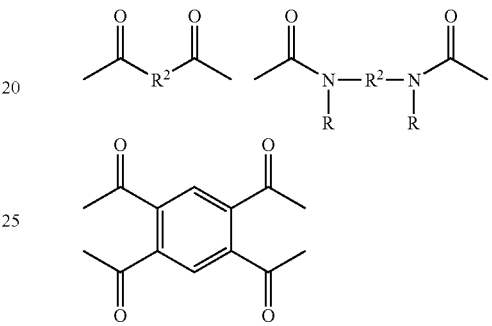

where
R is a hydrogen atom,
R² is a $C_1$-$C_{12}$-alkylene radical or an unsubstituted $C_6$-$C_{10}$-arylene radical;
Y is a chemical bond or —NR³—, where
R³ is a hydrogen atom or a direct covalent bond to X; and
m is a number between 2 and 30.

9. A process for preparing a pigment preparation as claimed in claim 1, comprising the steps of mixing the component (a) in the form of powder, granulate or press cake in the presence of water or of an organic solvent or of a mixture of water and organic solvent and optionally in the presence of component (c).

10. A synthetic material pigmented by a pigment preparation as claimed in claim 1.

11. An aqueous paint, emulsion, varnish color, water-thinnable varnish, wallpaper color or printing composition pigmented by a pigment preparation as claimed in claim 1.

12. A solvent-containing paint, emulsion, varnish color, wallpaper color or printing composition pigmented by a pigment preparation as claimed in claim 1.

13. An article or composition pigmented by a pigment preparation as claimed in claim 1, wherein the article or composition is selected from the group consisting of liquid printing inks, inkjet inks, electrophotographic toners, powder coatings, color filters, electronic inks electronic paper, wood preservation systems, viscose dope dyeing, sausage casings, seed, fertilizers, glass bottles roof shingles, coloring renders, concrete, woodstains, colored pencil leads, felt tip pens, waxes, paraffins, graphics inks, ballpoint pen pastes, chalks, washing and cleaning compositions, shoe care agents, latex products, abrasives and colored plastics.

14. A process for coloring a high molecular weight organic material, comprising the step of uniformly dispersing an effectively pigmenting amount of a pigment preparation as claimed in claim 1 in the organic material by stirring the pigment preparation into a suspension or solution of the organic material.

15. The pigment preparation as claimed in claim 2, wherein the polycyclic pigments are selected from the group consisting of phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone and isoindoline.

16. The pigment preparation as claimed in claim 2, wherein the acidic to alkaline carbon black is a furnace blacks or gas blacks.

17. A pigmented or dyed natural and synthetic fiber material, a dyed or pigmented paper or laminate pigmented or dyed by the pigment preparation as claimed in claim 1.

* * * * *